United States Patent [19]

Kozuki et al.

[11] Patent Number: 4,958,246
[45] Date of Patent: Sep. 18, 1990

[54] DEVICE OF MULTI-CHANNEL ROTARY HEAD TYPE HAVING FUNCTION TO DISCRIMINATE RECORDED STATE

[75] Inventors: Suzumu Kozuki, Tokyo; Hiroyuki Takimoto, Kanagawa; Motokazu Kashida, Tokyo; Koji Takahashi; Kenichi Nagasawa, both of Kanagawa, all of Japan

[73] Assignee: Canon Kabushiki Kaisha, Tokyo, Japan

[21] Appl. No.: 287,567

[22] Filed: Dec. 19, 1988

Related U.S. Application Data

[63] Continuation of Ser. No. 775,495, Sep. 12, 1985, abandoned.

[30] Foreign Application Priority Data

Dec. 17, 1984 [JP] Japan ................................ 59-265664
Dec. 17, 1984 [JP] Japan ................................ 59-265665
Dec. 17, 1984 [JP] Japan ................................ 59-254666

[51] Int. Cl.$^5$ ........................ G11B 5/584; G11B 5/09
[52] U.S. Cl. .................................. 360/77.15; 360/18; 360/19.1; 360/32; 360/77.14
[58] Field of Search ...:............................. 360/8–10.3, 360/13–14.3, 18, 19.1, 27, 32, 48, 49, 69–72.2, 73.04–73.14, 74.1, 74.4, 75, 77.12–77.17, 84, 85

[56] References Cited

U.S. PATENT DOCUMENTS

| | | | |
|---|---|---|---|
| 4,303,950 | 12/1981 | Taniguchi et al. | 360/10.3 |
| 4,390,906 | 6/1983 | Furumoto et al. | 360/19.1 |
| 4,477,844 | 10/1984 | Nakano et al. | 360/8 |
| 4,533,963 | 8/1985 | Nakano et al. | 360/19.1 |
| 4,558,378 | 12/1985 | Shibata et al. | 360/19.1 |
| 4,575,772 | 3/1986 | Shimada et al. | 360/19.1 |
| 4,583,132 | 4/1986 | Nakano et al. | 360/19.1 |
| 4,604,656 | 8/1986 | Fujii | 360/10.1 |
| 4,622,600 | 11/1986 | Okamoto et al. | 360/32 |
| 4,663,673 | 5/1987 | Doutsubo | 360/10.2 |
| 4,680,648 | 7/1987 | Takayama | 360/10.3 |

FOREIGN PATENT DOCUMENTS 0085578 8/1983 European Pat. Off. .
0102600 3/1984 European Pat. Off. .

Primary Examiner—Aristotelis M. Psitos
Assistant Examiner—Steven R. Garland
Attorney, Agent, or Firm—Toren, McGeady

[57] ABSTRACT

A rotary type recording and/or reproducing apparatus is provided with a rotary head which is arranged to record and/or reproduce information signals individually on or from a plurality of parallel areas longitudinally extending on a tape-shaped recorded bearing medium by obliquely transversely tracing the plurality of areas; a first detection circuit which is arranged to at least partially detect signals produced from the rotary head; a second detection circuit which is arranged to detect the rotation phase of the rotary head; and an arrangement for outputting a plurality of binary signals which respectively indicate whether the information signals are recorded or not in at least two of the plurality of areas according to the outputs of the first and second detection circuits.

25 Claims, 10 Drawing Sheets

DEVICE OF MULTI-CHANNEL ROTARY HEAD TYPE HAVING FUNCTION TO DISCRIMINATE RECORDED STATE

This is a continuation application of Ser. No. 774,495, filed Sept. 12, 1985, now abandoned.

BACKGROUND OF THE INVENTION

1. Field of the Invention

This invention relates to a rotary head type recording and/or reproducing apparatus, and, more particularly, to an apparatus arranged to record and/or reproduce information signals by rotary heads individually on or from a plurality of parallel areas longitudinally extending on a tape-shaped record bearing medium.

2. Description of the Prior Art

High density recording has recently become a subject of pursuit in the field of magnetic recording. Video tape recorders (hereinafter referred to as VTR's) also have become capable of performing magnetic recording to a higher degree of density with the travelling speed of the tape lowered. Therefore, the conventional arrangement of using a fixed head for audio signal recording does not give a sufficiently high relative speed and thus results in the degradation of reproduced sound quality. In one of the solutions of this problem, the recording tracks formed by a rotary head are lengthened to have audio signals, which are compressed on the time base, recorded in the lengthened portion of the recording tracks one after another.

In the case of a VTR of the two-rotary-head helical scanning type, for example, a magnetic recording tape has been arranged to be wrapped at least 180 degrees around a rotary cylinder. Then, a VTR of this type has been contrived, according to the above-stated solution, wherein the magnetic recording tape is wrapped at least $(180+\theta)$ degrees around the rotary cylinder; and time-base compressed audio signals, which are pulse code modulated, are recorded in the additional portion of $\theta$ degree. FIG. 1 of the accompanying drawings schematically shows the tape transport system of the above-stated VTR. FIG. 2 shows recording tracks formed on a magnetic tape by the VTR of FIG. 1. The illustration includes a magnetic tape 1; a rotary cylinder 2; heads 3 and 4 which are mounted with a phase difference of 180 degrees on the cylinder 2 and have azimuth angles, different from each other; video signal recording areas 5 formed on the tape 1; and audio signal recording areas 6 formed also on the tape 1. Each of the video areas 5 is formed with the 180 degree wrapped portion of the tape 1 on the rotary cylinder 2 traced by the heads 3 and 4. Each of the audio areas 6 is formed with the angle $\theta$ degree portion of the tape wrapped the cylinder 2 traced by the heads 3 and 4. In FIG. 2, reference symbols f1 to f4 represent the frequency values of tracking pilot signals superimposed on the recording tracks in accordance with a known four-frequency method. The frequency values of these pilot signals are in the following relation: $f2-f1=f3-f4\approx fH$ and $f4-f2\approx 2fH$, wherein fH represents the horizontal scanning frequency of the video signal.

With the audio signal, which is compressed on the time base and is pulse code modulated (hereinafter referred to as PCM processed), recorded in the audio areas, the audio signal can be reproduced with a high sound quality, which is comparable with the quality attainable by an audio apparatus which is adapted specially for recording and reproduction of an analog signal.

Meanwhile, there has been proposed a method of recording additional audio signals also in the video areas 5 of the VTR of the above-stated type. This method is as follows: Assuming that the angle $\theta$ is arranged to be $\theta=36$ degrees, five additional audio areas are obtainable with the rotary head rotated 180 degrees. Then, an arrangement to have time-base compressed audio signals recorded independently in these areas enables audio signals to be recorded in six channels. Thus, an audio dedicated or appropriated tape recorder can be arranged to be capable of recording audio signals in six channels. The following briefly describes this tape recorder FIG. 3 shows the tape transport system of the above-stated tape recorder FIG. 4 shows recording tracks formed on a tape by this tape recorder The same reference numerals and symbols are used as in FIGS. 1 and 2. While the head 3 or 4 traces distances from a point A to a point B, from the point B to a point C, from the point C to a point D, from the point D to a point E, from the point E to a point F and from the point F to another point G, audio signals can be recorded in areas CH1 to CH6. These areas CH1 to CH6 thus can be used for recording different audio signals therein respectively. An operation called azimuth-overwrite is performed on these areas. However, the tracks of these areas CH1–CH6 do not have to be on the same straight line Each of the areas CH1–CH6 has one pilot signal recorded therein for tracking control. Different pilot signals are thus recorded in different areas in the order of rotation f1→f2→f3→f4. However, there is no correlation between them.

Referring further to FIG. 3, recording or reproduction is carried out in or from these areas CH1 to CH3 while the tape 1 is travelling at a predetermined speed in the direction of arrow 7, and in or from the areas CH4 to CH6 while the tape is travelling in the direction of arrow 9. Therefore, as shown in FIG. 4, the inclination of the areas CH1 to CH3 somewhat differs from that of the areas CH4 to CH6. With regard to a difference in the relative speed of the tape and the head for these groups of areas, a difference arising from the travel of the tape 1 is extremely small as compared with a difference arising from the rotation of the heads 3 and 4. Therefore, the difference in the relative speed presents no problem.

FIGS. 5(a) to 5(f) show, in a time chart, the recording or reproducing operation of the tape recorder which is arranged as described above. A phase detection pulse (hereinafter referred to as a PG signal), which is generated in synchronism with the rotation of the cylinder 2, is shown at FIG. 5(a). This first PG signal is of a rectangular wave of 30 Hz repeating a high level (hereinafter referred to as an H level) and a low level (hereinafter referred to as an L level) alternately with each other at intervals of 1/60 sec. A second PG signal which is of the opposite polarity to the first PG signal of FIG. 5(a), is shown in FIG. 5(b). The first PG signal is at an H level while the head 3 is rotating from the point B to the point G of FIG. 3. The second PG signal shown in FIG. 5(b) is at an H level while the other head 4 is rotating from the point B to the point G.

Pulses for reading data are obtained from the first PG signal of FIG. 5(a) as shown in FIG. 5(c). The data reading pulses are used for sampling the audio signal of a period corresponding to one field (1/60 sec). FIG.

5(d) shows, by H level parts thereof periods provided for signal processing on the one field portion of the sampled audio data by adding an error correcting redundant code or by changing the arrangement thereof by means of a RAM or the like. FIG. 5(e) shows a signal indicating data recording periods at H level parts thereof which represent timing for recording, on the tape 1, the recording data obtained through the signal processing operation mentioned above.

Referring to FIGS. 5(a) to 5(j), the temporal flow of signals are, for example, as follows: The data, sampled during a period from a point of time t1 to a point of time t3, i.e. while the head 3 is moving from the point B to the point G, is subjected to a signal processing operation during a period from the point of time t3 to a point of time t5, i.e. while the head 3 is moving from the point G to the point A and are then recorded during a period from the point of time t5 to a point of time t6, or while the head 3 is moving from the point A to the point B. In other words, the data is recorded by the head 3 in the area CH1 as shown in FIG. 4. Meanwhile, the data, which is sampled while the second PG signal of FIG. 5(b) is at an H level, is also processed at a similar timing before it is recorded in the area CH1 by the head 4.

FIG. 5(f) shows a third PG signal which is obtained by shifting the phase of the first PG signal of FIG. 5(a) to a predetermined degree, which corresponds to one area and is 36 degrees in this specific instance.

An audio signal recording operation using the third PG signal of FIG. 5(f) another PG signal, which is not shown but is of an opposite polarity to the former, is performed in the following manner: The data, which is sampled during a period between the points of time t2 and t4, is subjected to a signal processing operation during a period between the points of time t4 and t6 in accordance with the signal of FIG. 5(g) and is recorded during a period between the points of time t6 and t7 in accordance with the signal of FIG. 5(h). In other words, the data is recorded in the area CH2 of FIG. 4 while the head is moving from the point B to the point C. Meanwhile, another data, which is sampled during the points of time t4 and t7, is likewise recorded in the area CH2 by means of the other head during a period between the points of time t4 and t7.

The signal which is recorded in the area CH2 in the manner as described above is reproduced in the following manner:

The head 3 reads the data from the tape 1 in accordance with the signal shown in FIG. 5(h) during the period between the points of time t6 and t7 (and also during the period between the points of time t1 and t2). Then, during the period between the points of time t7 and t8 also (between t2 and t3), the reproduced signal is subjected to a signal processing operation which is carried out, in a manner reverse to the signal processing operation performed for recording, in accordance with a signal shown in FIG. 5(i). In other words, error correction and other processes are carried out during this period. Then, during a period between points of time t8 and t9, the reproduced audio signal which has been thus processed is produced in accordance with a signal shown in FIG. 5(j). The reproducing operation of the head 4 is of course performed with a phase difference of 180 degrees from the above-stated reproduction by the head 3, so that a continuous reproduced audio signal can be obtained For the other areas CH3 to CH6, it goes without saying that the recording and reproducing operation are performed on the basis of the first PG signal of FIG. 5(a) by phase shifting it as much as n X 36 degrees. This is independent of the travelling direction of the tape.

The prior art arrangement described above thus permits use of a VTR as an apparatus of multiple channel arrangement adapted solely for audio signal recording and/or reproduction. However, it is a problem with such a multi-channel audio-dedicated apparatus that the operating conditions of the plurality of divided channels cannot A readily be grasped. It indeed takes an excessively long period of time to reproduce the record from all the areas CH1 to CH6 one after another. It is quite troublesome for the users to find out whether these areas have been recorded on or not by carrying out tracking control for every one of these areas one after another. Hence, the prior art arrangement described has been hardly practicable.

SUMMARY OF THE INVENTION

In view of the background situations described above, it is an object of the present invention to provide a recording and/or reproducing apparatus which is capable of enabling the users to readily grasp the recorded conditions of information signals on a record bearing medium.

It is another object of this invention to provide a rotary head type recording and/or reproducing apparatus which is capable of promptly discriminating the recorded conditions of information signals in a plurality of areas arranged on a tape-shaped record bearing medium in parallel with each other and extending in the longitudinal direction of the medium.

Under this object, a rotary head type recording and/or reproducing apparatus arranged according to this invention as an embodiment thereof comprises: rotary heads for recording and/or reproducing information signals individually in or from a plurality of parallel areas extending in the longitudinal direction of a tape-shaped record bearing medium, the heads being arranged to trace the medium in such a manner as to traverse said plurality of areas; first detection means for at least partially detecting the output signals of the rotary heads; second detection means for detecting the rotation phase of the rotary heads; and discriminating means for discriminating the recorded conditions of the information signals in the plurality of areas according to outputs of the first and second detection means.

It is a further object of this invention to provide a rotary head type recording and/or reproducing apparatus which is capable of simultaneously recognizing the recorded conditions of information signals recorded in a plurality of areas arranged in parallel with each other on a tape-shaped record bearing medium and extending in the longitudinal direction of the medium.

Under that object, a rotary head type recording and/or reproducing apparatus arranged according to this invention as an embodiment thereof comprises: rotary heads for recording and/or reproducing information signals individually in or from a plurality of areas of a tape-shaped record bearing medium which are in parallel with each other and are extending in the longitudinal direction of the medium, the rotary heads being arranged to trace the tape-shaped medium in such a manner as to traverse the plurality of parallel areas; discriminating means for discriminating the recorded conditions of the information signals in the plurality of areas according to the output signals of the rotary heads; and data output means for producing a plurality of data which are indicative of the recorded conditions of the plurality of areas and are obtained from the discriminating means.

It is a further object of this invention to provide a rotary head type recording and/or reproducing apparatus which is capable of reliably finding which of information signals of more than two different kinds is recorded.

Under the above-stated object, a recording and/or reproducing apparatus arranged as an embodiment of this invention comprises: first detection means for detecting which of first and second information signals is recorded in a specific area on a record bearing medium; second detection means for detecting that the first information signal is recorded in the specific area; and means for discriminating that the second information signal is recorded in the specific area on the basis of outputs of the first and second detection means.

The above and further objects and features of the invention will become apparent from the following detailed description of preferred embodiments thereof taken in connection with the accompanying drawings.

DETAILED DESCRIPTION OF THE PREFERRED EMBODIMENTS

Figure 6:
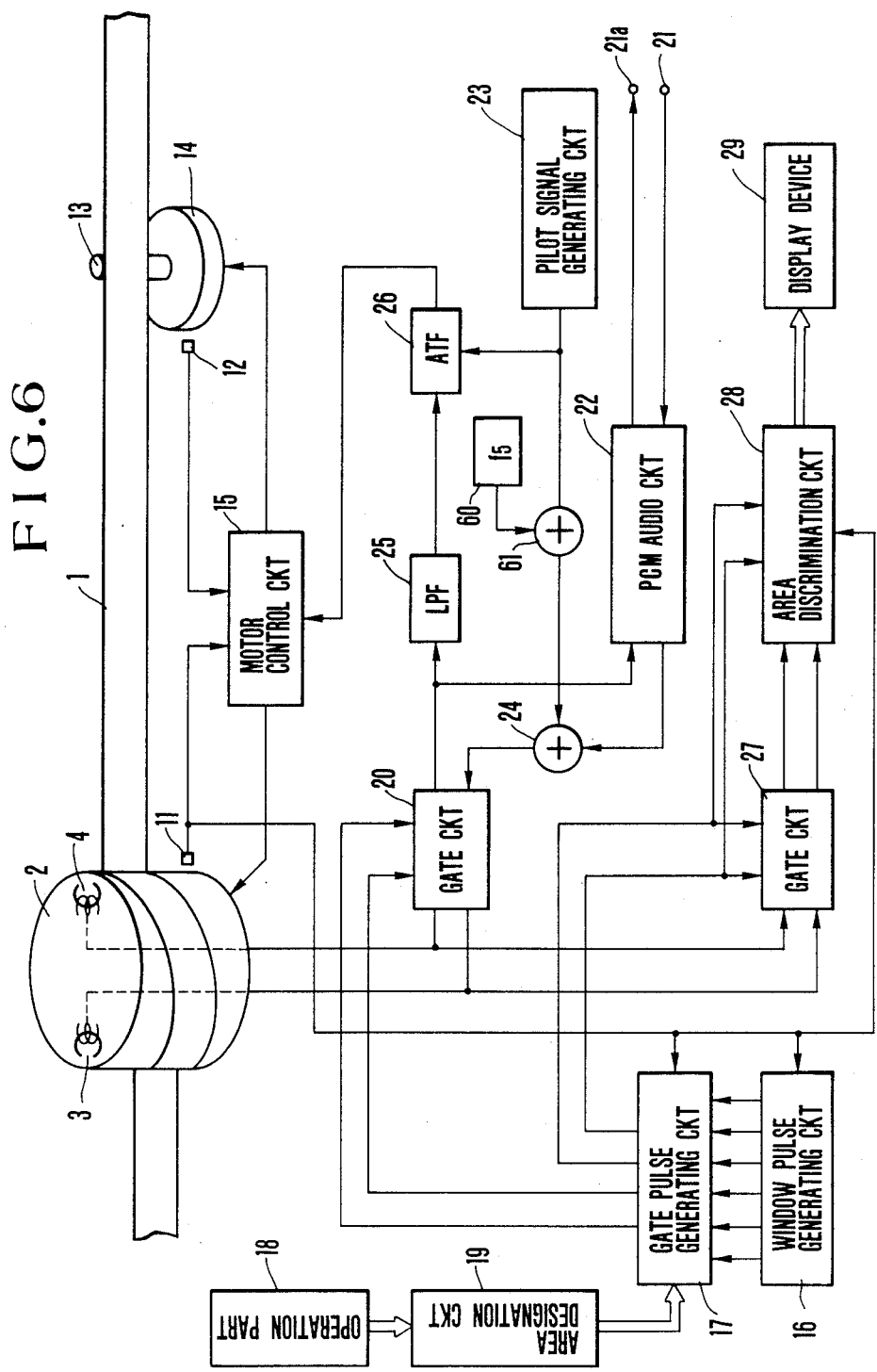
FIG. 6 is a diagram schematically showing the arrangement of a tape recorder embodying this invention as an embodiment thereof.

The following describes some preferred embodiments of the invention with reference to the accompanying drawings:

FIG. 6 shows the outline of arrangement of a tape recorder according to this invention as an embodiment thereof. In FIG. 6, components of the recorder similar to these shown in FIGS. 1 to 4 are indicated by the same reference numerals. A PG signal is obtained from a rotation detector 11 which detects the rotation of a rotary cylinder 2. The PG signal is supplied to a motor control circuit 15, which causes the cylinder 2 to rotate at a predetermined speed and also at a predetermined phase. Another rotation detector 12 is arranged to detect the rotation of a fly-wheel 14 of a capstan 13. The output of the fly-wheel rotation detector 12 is supplied to the motor control circuit 15. During a recording operation, the circuit 15 controls the capstan 13 to have it rotate at a predetermined speed.

Figure 7:
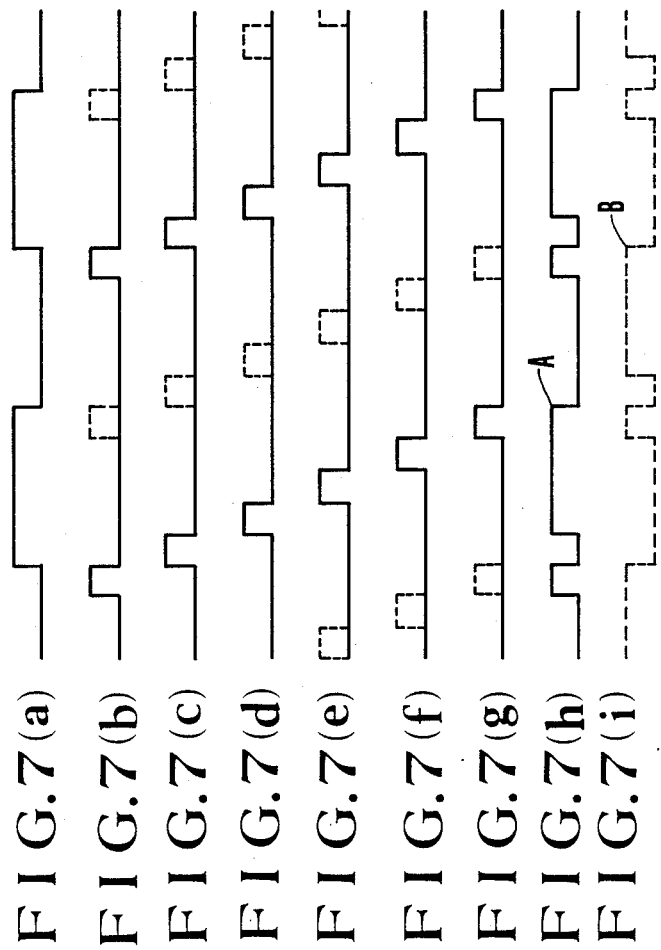
FIGS. 7(a) to 7(i) show, in a timing chart, the phasic relation of window and gate pulses to a PG signal.

The above-stated PG signal is supplied also to a window pulse generating circuit 16 and a gate pulse generating circuit 17. The phasic relation of window and gate pulses generated by these circuits 16 and 17 to the PG signal is as shown in the timing chart of FIGS. 7(a) to 7(i). FIG. 7(a) shows the PG signal. The PG signal is at a high level while a head 3 is moving from the point B to another point G shown in FIG. 3. FIGS. 7(b) to 7(g) respectively show window pulses which indicate recording and reproducing timing in and from the areas CH1 to CH6. In FIGS. 7(a) to 7(i), full lines indicate signals relative to the head 3 while broken lines indicates signals relative to another head 4.

When an operation part 18 is manually operated, an applicable area is designated for recording or reproduction with either a recording or reproducing operation mode also designated by the manual operation. Then, an area designation circuit 19 supplies an area designation data thus obtained to the gate pulse generating circuit 17. The circuit 17 generates a desired gate pulse signal.

Figure 4:
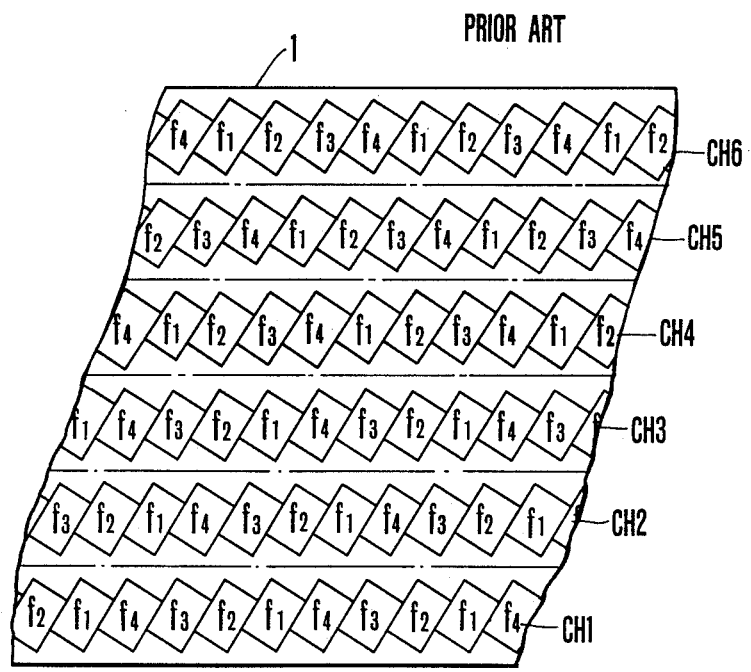
FIG. 4 shows recording tracks formed on a magnetic tape by the tape recorder shown in FIG. 3.
Figure 5:
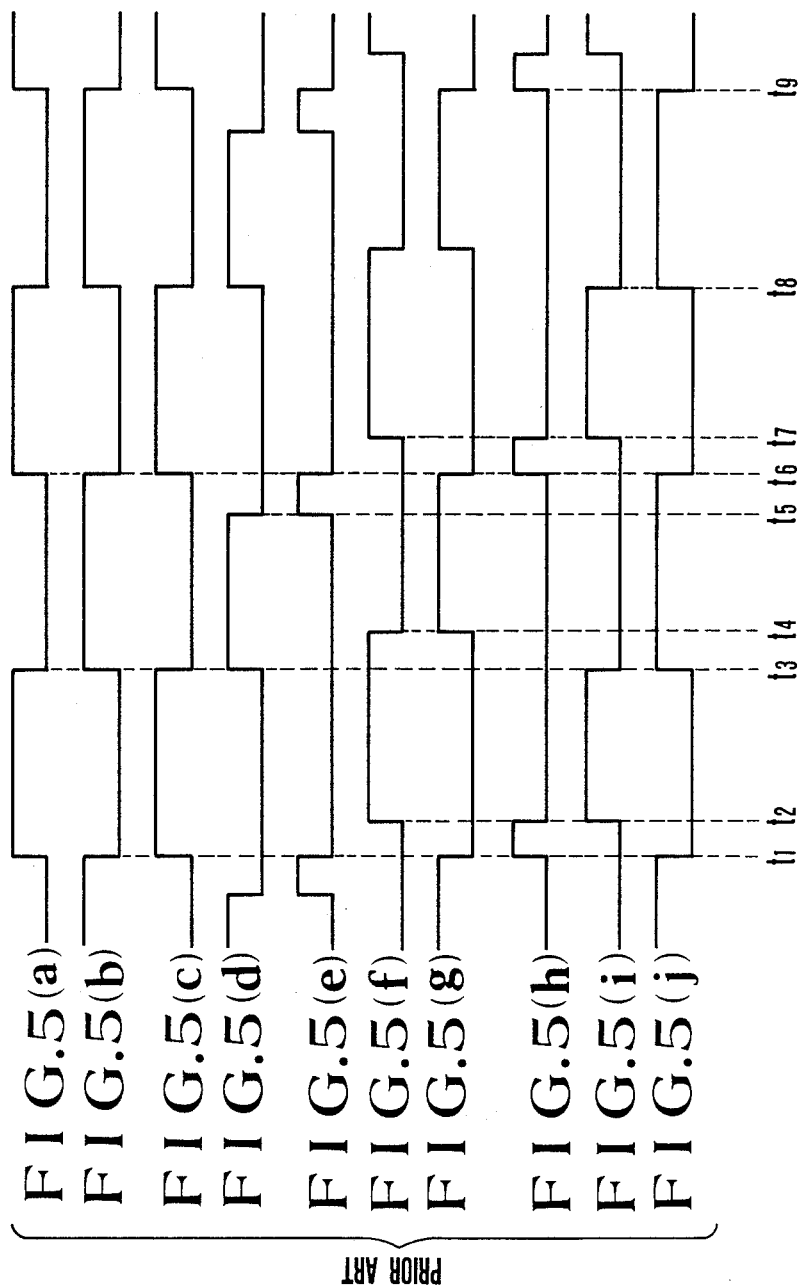
FIGS. 5(a) to 5(j) show in a time chart, the reocrding an reproducing operations of the tape recorder shown in FIG. 3.

A gate circuit 20 is arranged to have one of the above-stated window pulses of FIGS. 7(b) to 7(g) selectively supplied thereto on the basis of the area designation data as control gate pulse for each of the heads 3 and 4. Assuming that the area CH2, which is shown in FIG. 4, is designated, the gate circuit 20 comes under the control of the window pulse of FIG. 7(c).

During a recording operation, an analog audio signal, coming via a terminal 21, is sampled by a PCM audio circuit 22 at a timing according to the window pulse of FIG. 7(c). The sampled signal becomes a digital data and is subjected to the above-stated signal processing operation. The audio signal is thus processed to become an audio data for recording. A pilot signal generating circuit 23 is arranged to generate tracking pilot signals of different frequency values f1, f2, f3 and f4 in the order of rotation of f1→f2→f3→f4. Meanwhile, an oscillator 60 generates another pilot signal having a predetermined frequency value of f5. An adder 61 adds the signal of the frequency f5 to each of the pilot signals of frequency values f1 to f4 to produce mixed signals. Then, another adder 24 adds each of the mixed signals to the recording audio data produced from the PCM audio circuit 22. The output of the adder 24 is appropriately gated by the gate circuit 20, as mentioned in the foregoing, and is written into the area CH2 by the heads 3 and 4. Thus, in addition to the tracking pilot signals, the pilot signal of frequency f5 is recorded also together with the PCM audio signal. The above-stated frequency f5 must be arranged to be unaffected by the azimuth angle and to be lower the frequency band associated with the above-stated PCM audio signal.

In the case of reproduction, the signal reproduced by the heads 3 and 4 is supplied to a low-pass filer (hereinafter referred to as LPF) 25 and to the PCM audio circuit 22 via the gate circuit 20 also according to the window pulses of FIG. 7(c). In this instance, unlike in the case of recording, the PCM audio circuit 22 performs a signal processing operation including an error correcting process, a time-base extending process, a digital-to-analog conversion process, etc., to obtain a reproduced analog audio signal, which is produced from a terminal 21a.

The LPF 25 is arranged to separate the above-stated pilot signals for tracking and to supply them to an ATF circuit 26. The ATF circuit 26 is arranged to give a tracking error signal operating in accordance with a known four-frequency method. In other words, the ATF circuit uses the reproduced tracking pilot signals and also pilot signals which are generated by the pilot signal generating circuit 23 in the same order of rotation as in the case of recording in a well known manner. A tracking error signal which is thus obtained is supplied to the motor control circuit 15. With the error signal thus supplied, the circuit 15 performs tracking control by adjusting the travelling speed of the tape 1 via the capstan 13.

Meanwhile, a gate circuit 27 is under the control of the gate pulses shown in FIGS. 7(h) and 7(i). In other words, signal reproduced from areas other than the reproducing area are supplied to an area discrimination circuit 28.

Figure 8:
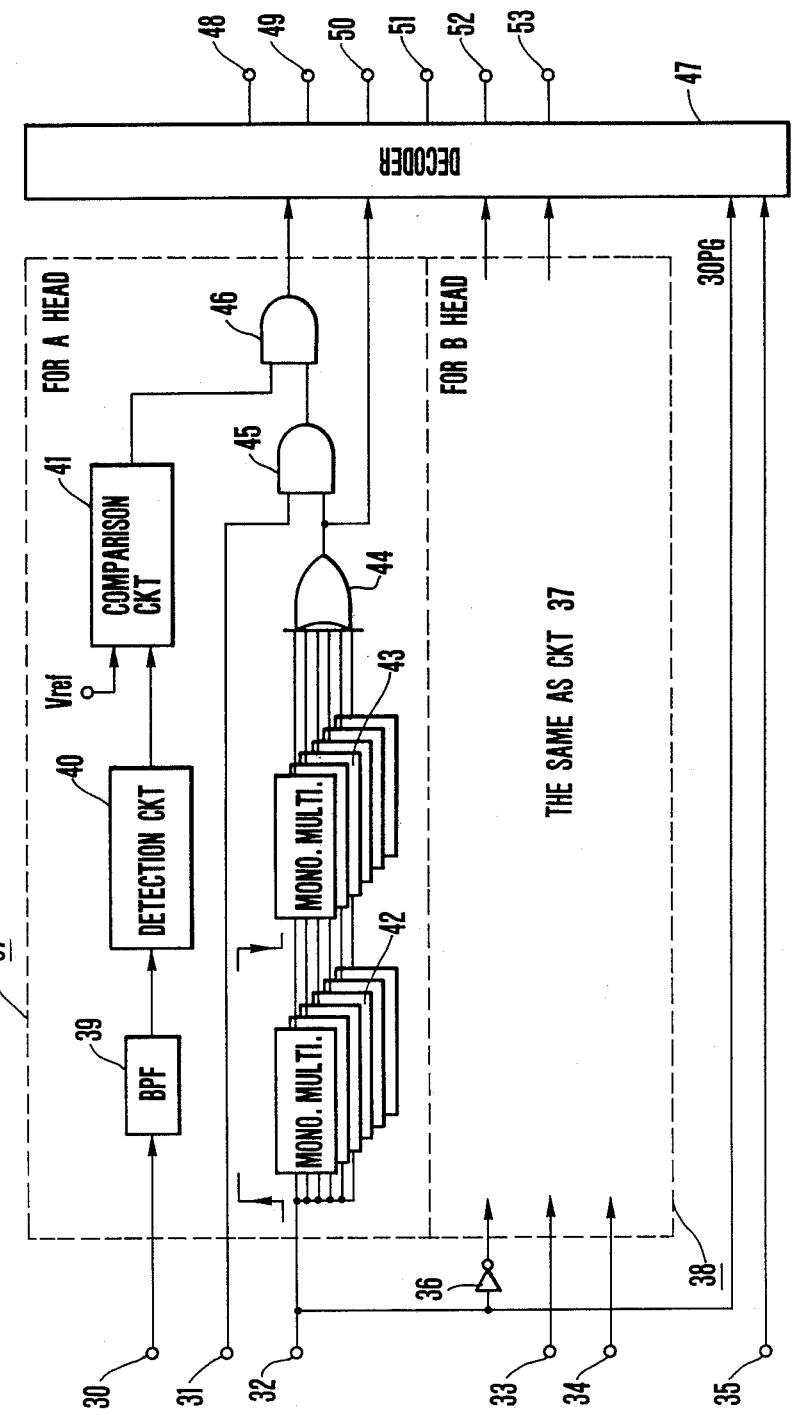
FIG. 8 is a diagram showing a specific example of arrangement of an area discrimination circuit shown in FIG. 6.
Figure 9:
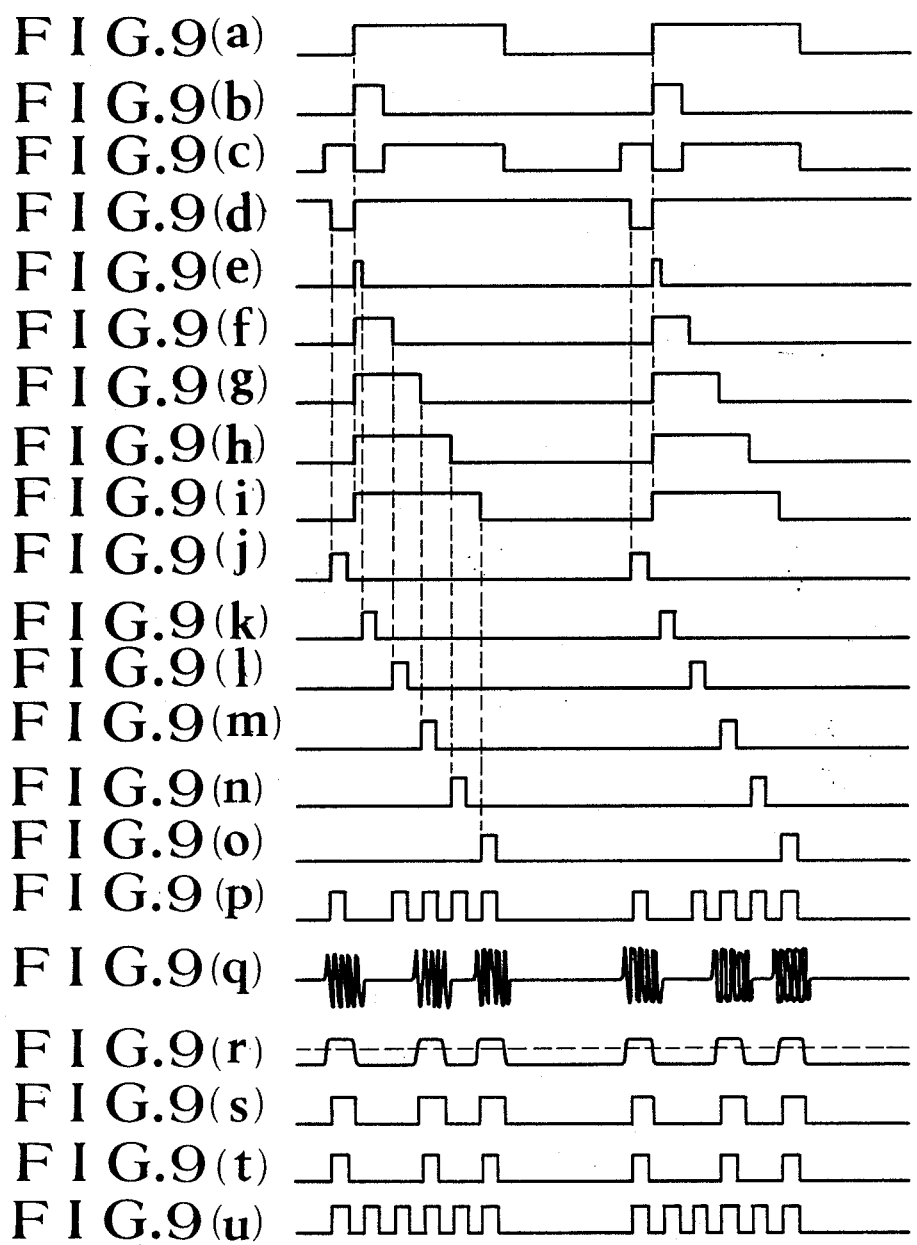
FIGS. 9(a) to 9(u) show, in a timing chart, the operating timing of various parts of FIG. 8.

The area discrimination circuit 28 is arranged in the following manner: FIG. 8 shows an example of arrangement of this circuit 28. FIGS. 9(a) to 9(u) show, in a timing chart, the operating timing of various parts of FIG. 8. Referring to FIG. 8, terminals 30 and 33 are arranged to receive signals reproduced by the heads 3 and 4. Terminals 31 and 34 are arranged to receive the above-stated gate pulses of FIGS. 7(h) and 7(i). A terminal 32 is arranged to receive the PG signal.

The circuit arrangement consists of a discrimination circuit 37 for an A head (or the head 3); a discrimination circuit for a B head (or the head 4); and a decoder 47 which is arranged to serial-to-parallel convert the outputs of these discrimination circuits 37 and 38 and to produce them in the form of a data consisting of six bits. Since the two discrimination circuits 37 and 38 are arranged in the same manner, the internal details of the circuit 38 are omitted from the following description.

The operation of the area discrimination circuit 28 is as follows: Let us now assume for the sake of description that the area CH2 is the area being reproduced; the areas CH1, CH4 and CH6 have a signal recorded therein; and the areas CH3 and CH5 have no signal recorded therein.

A monostable multivibrator group 42 is arranged to be triggered by the rise of the PG signal which is shown in FIG. 9(a). Each member of the monostable multivibrator group 42 is arranged to have such a time constant that makes their outputs as shown in FIGS. 9(e) to 9(i), respectively. More specifically, assuming that a minute length of time $(1/30 \times \frac{1}{2} \times 1/5 \times 1/10$ sec or thereabout) is $\Delta t$, the constant of each of the group of monostable multivibrators 42 corresponding to N-th channel (or area) subsequent to the channel CH1, is arranged to become the time $\Delta t$ (sec) when the value N is 1 and to become $(N-2)/300 + \Delta t$ (sec) when the value N is 2 or larger than 2.

Another group of monostable multivibrators 43, which are arranged to be triggered by the fall of the outputs of the monostable multivibrator group 42, gives six different pulses of a predetermined width. The time constant of each of the monostable multivibrators 43 is arranged to about $1/60 \times 1/5 \times 4/5$ sec. As is apparent from the waveforms shown in FIGS. 9(j) to 9(q), each area can be detected at its middle point by means of the pulses obtained from these multivibrators 43. All the outputs of the multivibrator group 43 are supplied to an OR gate 44. Then, they are supplied to an AND gate 45 as sampling pulses. They are also used as clock pulses from the serial-to-parallel converting operation of the decoder 47.

The AND gate 45 obtains a logical product of the output of the OR gate 44 and the gate pulse which is shown at FIG. 9(c) and is mentioned in the foregoing. By this, recorded conditions are detected only for the areas other than the reproducing area.

Meanwhile, the reproduced signal is supplied to a band-pass filter 39 (BPF) to have the pilot signal of frequency f5 separated there. The output of the BPF 39, which is as shown in FIG. 9(q), is detected by a detection circuit 40 and is then compared with a reference voltage at a comparison circuit 41 The output of the comparison circuit 41 is sampled at an AND gate 46. The output thus sampled is a signal indicative of the recorded condition of each area and is as shown in FIG. 9(t). This signal is processed through the decoder 47 and is produced from the terminals 48→53 in the form of parallel data. In case that all the areas CH1 to CH6 have been already recorded, the levels of signals or data produced from these terminals 48 to 53 of the decoder 47 become a high level (h). If all the areas have not been recorded, the levels of all these signals become a low level (L). These parallel data are then supplied to a display device 29 which consists of light emitting diodes (LED's) or the like. The display device thus enables the operator to know the recorded conditions of these areas.

With the tape recorder arranged according to this invention in the manner as described above, the recorded conditions of all the areas of the multi-channel arrangement can be simultaneously found.

In the embodiment described, the recorded conditions of the areas are described as to be detected during reproduction. However, it goes without saying that the recorded conditions are likewise detectable also during recording or during a high speed tape feeding operation. Further, the recording conditions can be immediately detected as long as the magnetic tape 1 is in a state traceable by the rotary heads 3 and 4.

Even in cases where neither the oscillator 60 of the frequency f5 nor the adder 61 is additionally provided, the recorded conditions of all the areas CH1 to CH6 can be likewise detected. An embodiment which is arranged in that manner is as shown in FIGS. 10, 11 and 12.

Figure 1:
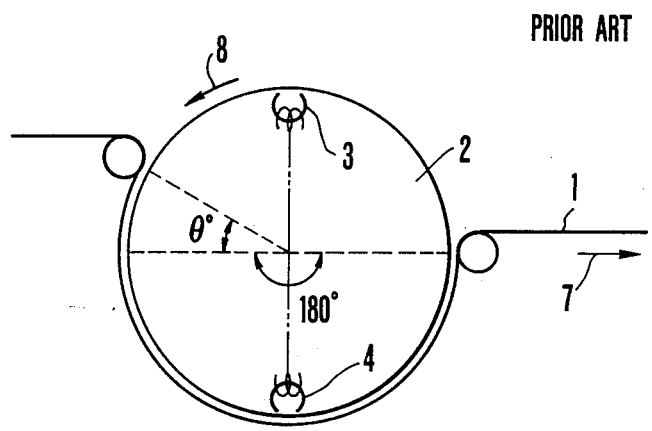
FIG. 1 is a schematic illustration showing the arrangement of the tape transport system employed in the conventional VTR.
Figure 2:
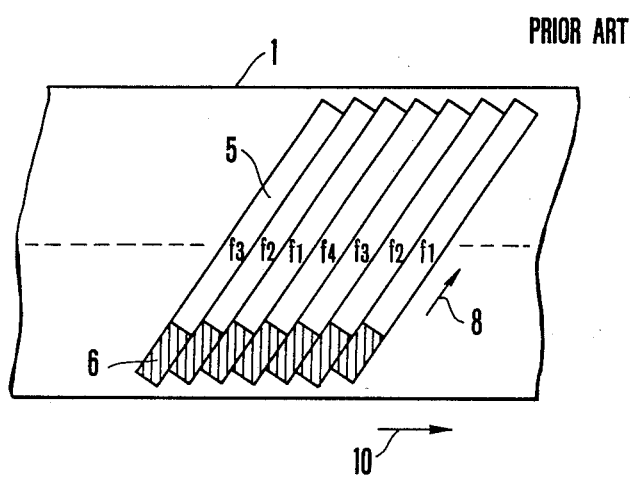
FIG. 2 is a schematic illustration showing recording tracks formed on a magnetic tape by the VTR shown in FIG. 1.
Figure 3:
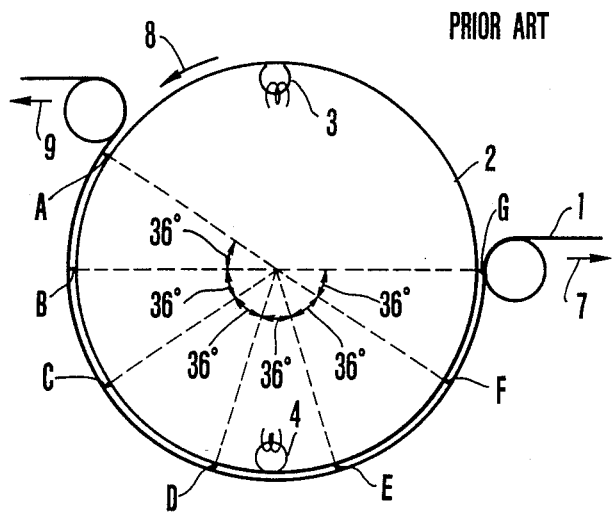
FIG. 3 is a schematic illustration showing the arrangement of the tape transport system employed in a multi-channel type tape recorder of the prior art.
Figure 10:
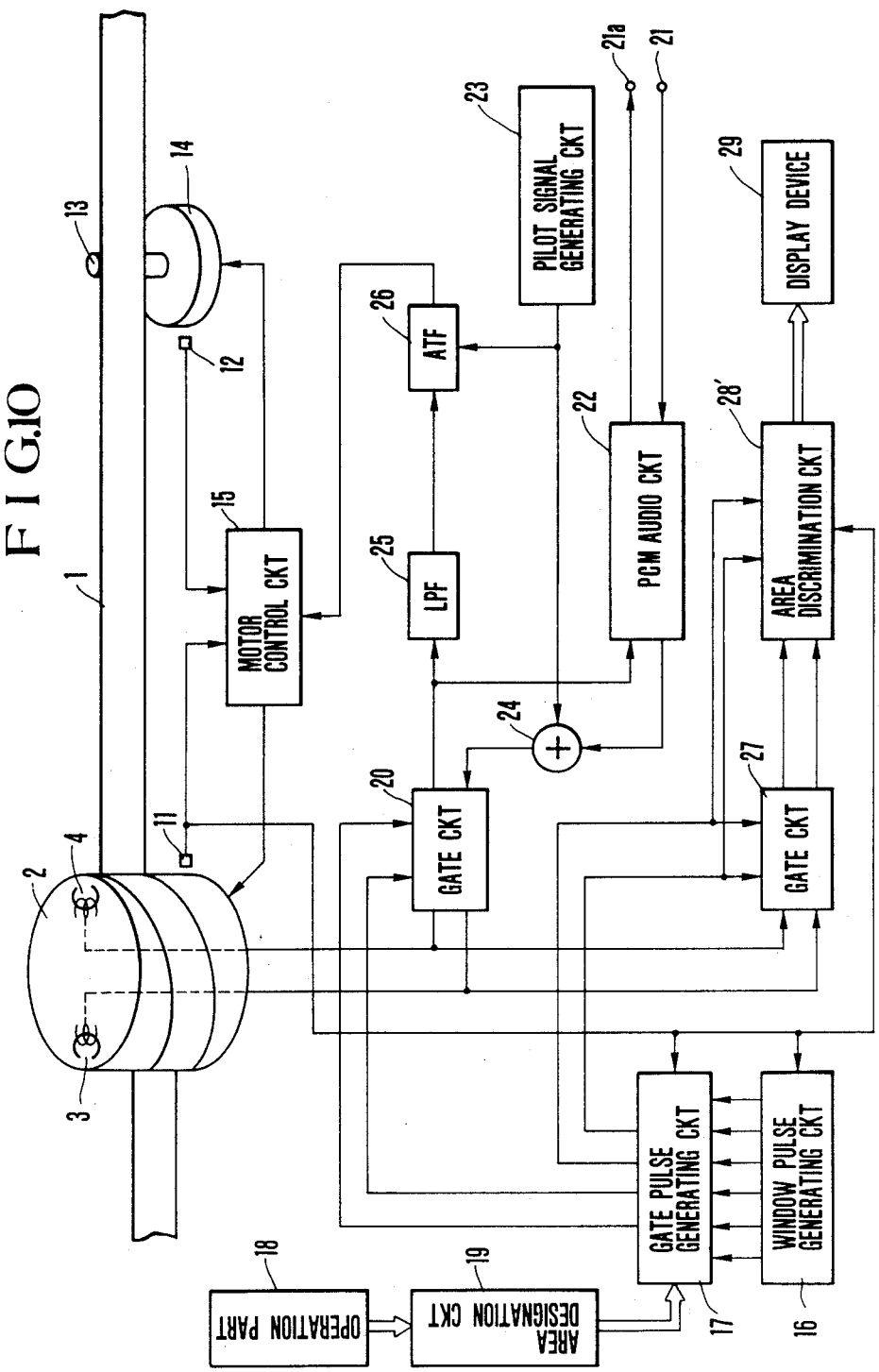
FIG. 10 is a diagram schematically showing the arrangement of a tape recorder according to this invention as another embodiment thereof.
Figure 11:
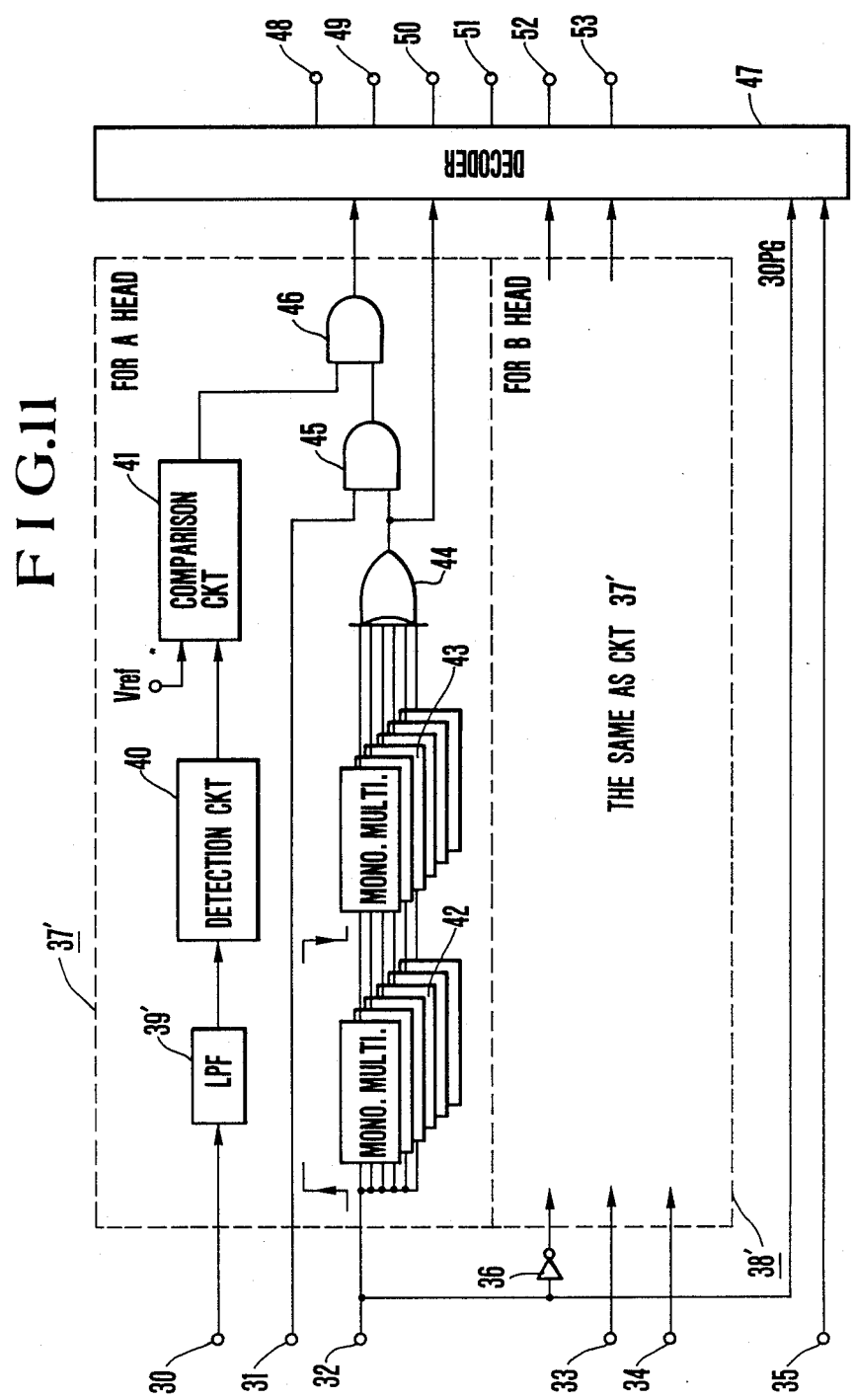
FIG. 11 is a diagram showing, by way of example, the arrangement of an area discrimination circuit included in the embodiment shown in FIG. 10.

FIG. 10 shows the outline of an arrangement of a tape recorder according to this invention as a further embodiment thereof mentioned above. The components similar to corresponding ones shown in FIG. 6 are indicated by the same reference numerals and details of them are omitted from description here. The embodiment includes an area discrimination circuit 28' which is arranged in the same manner as the area discrimination circuit shown in FIG. 8; and a BPF 39 which is arranged to mainly filter, for example, an RF signal. This arrangement permits detection of the recorded conditions of all the areas without necessitating the additional recording of the pilot signal of frequency f5. In this case, however, it is necessary to make the tracing width of the rotary heads 3 and 4 wider than the pitch of recording tracks. Further, it is also conceivable to detect, by means of the area discrimination circuit 28'', the tracking pilot signals instead of detecting the frequency component f5 or the RF signal. In that instance, the above-stated tracking pilot signal components f1, f2, f3 and f4 are separated by means of an LPF 39' which is arranged as shown in FIG. 11. In the case of FIG. 11, the area discrimination circuit 28' is adapted solely for audio signals. In the event of a tape recorder designed solely for audio signals, the recorded conditions of all the areas are detectable by the arrangement of the embodiment described above. Let us now consider a video-audio tape recorder which is capable of operating as a VTR in accordance with the recording format as shown in FIG. 2 and is also capable of recording or reproducing video signals or audio signals with the audio signal recording area 6 of FIG. 2 arranged in the same manner as the area CH1 as shown in FIG. 4. In recording an audio signal, for example, individually in the area CH5 in accordance with the recording pattern shown in FIG. 4, let us assume that the tape 1 has already been recorded in a manner as shown in FIG. 2. In that instance, the record in the area CH5 is individually erased before the audio signal is recorded therein. Meanwhile, the pilot signals for tracking remain unerased in other areas CH2, CH3, CH4 and CH6.

Figure 12:
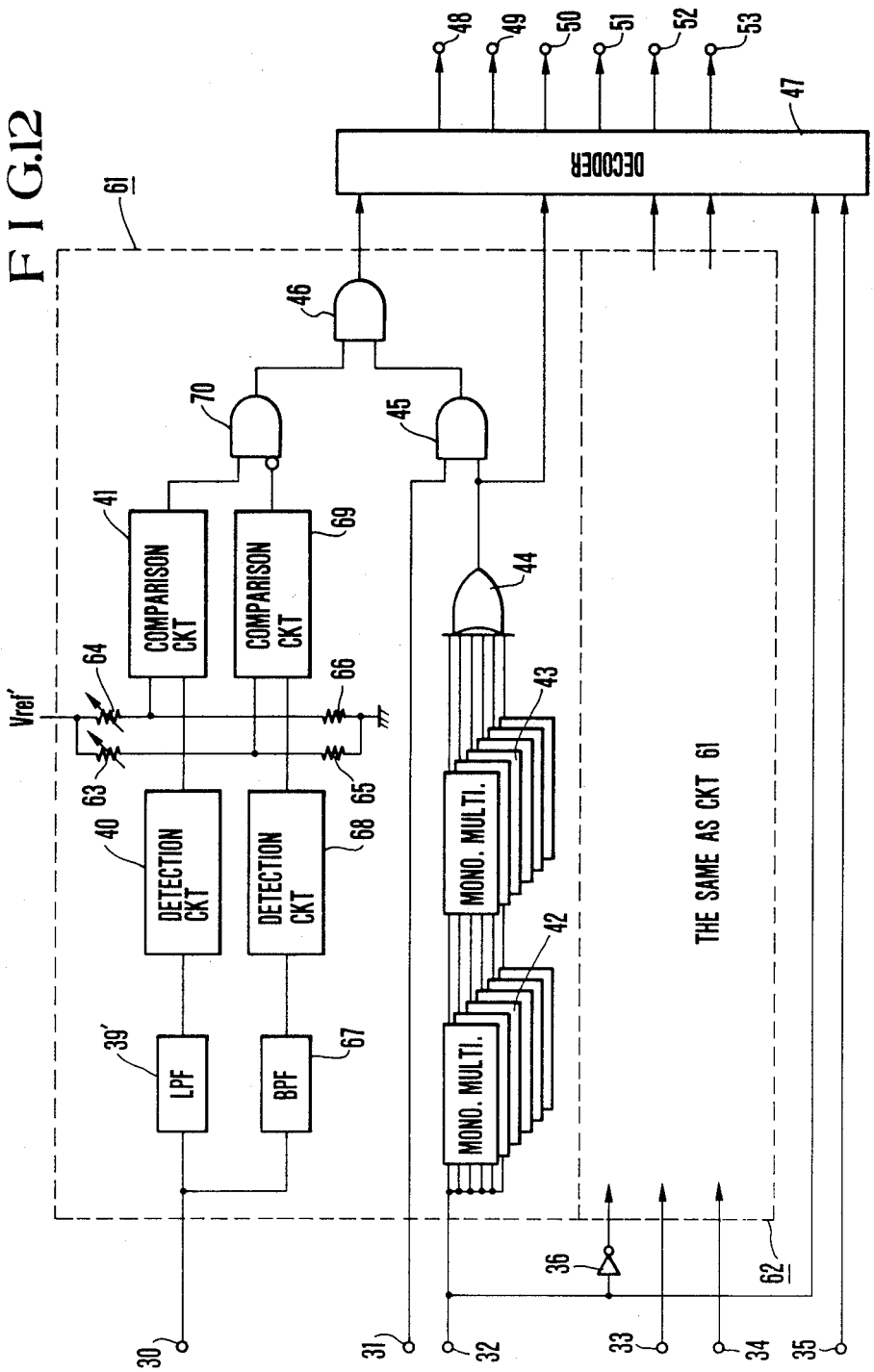
FIG. 12 is a diagram showing another example of arrangement of the area discrimination circuit shown in FIG. 10.

In case that the area discrimination circuit 28' indicated in FIG. 10 is arranged with the above taken into consideration, the arrangement of this circuit 28' becomes as shown in FIG. 12. In FIG. 12, the same component elements as those shown in FIG. 11 are indicated by the same reference numerals and the detailed description of them is omitted from the following description of this example:

The circuit 28' in this case includes a BPF 67 which is arranged to detect the color subcarrier wave of a video signal included in a reproduced signal. Assuming that the video signal has been recorded in accordance with the so-called low band converting method, the BPF 67 is arranged to have a passband from 600 to 800 KHz or thereabout. Meanwhile, the heads 3 and 4 are arranged to have such azimuth angles that are having no adverse effect on the band of about 600 to 800 KHz.

The low band color subcarrier component, which is detected by the BPF 67, is detected by a detection circuit 68 and is then supplied to a comparison circuit 69 to be compared with a reference voltage. Variable resistors 63 and 64 and fixed resistors 65 and 66 form a pair of voltage dividers, which are arranged to divide a voltage Vref' indicated in the drawing. They provide different reference voltages to comparison circuits 41 and 69 in such a way as to compensate for a difference between the recording level of the pilot signals for tracking and that of the low band converting color subcarrier wave.

Assuming that a tracking pilot signal and a color subcarrier wave are detected from a specific area, the circuit 28' judges that no PCM audio signal is recorded. If the color subcarrier wave is not detected while the tracking pilot signal is detected, a PCM audio signal is considered to be recorded in that area. Accordingly, the output of a logic gate 70 comes to indicate the recorded condition of the PCM audio signal in each of the areas in a time sharing manner. Then, parallel data are produced from the terminals 48 to 53 of the decoder 47 in the same manner as in the case of the preceding example shown in FIG. 11.

In the case of the example shown in FIG. 12, the discrimination as to whether a video signal has been recorded or not is accomplished by detecting the color subcarrier wave. However, this arrangement may be replaced with a different arrangement in which the same discrimination is accomplished by detecting any other frequency component that is peculiar to the video signal.

What is claimed is:

1. A rotary head type recording and/or reproducing apparatus, comprising:
   (a) head means for recording and/or reproducing information signals individual in or from a plurality of parallel areas extending in the longitudinal direction of a tape-shaped record bearing medium, said head medium, said head means including a rotary head which is arranged to trace said medium in such a manner as to obliquely traverse said plurality of areas;
   (b) first detection means for at least plurality detecting signals produced from said rotary head;
   (c) second detection means for detecting the rotating phase of said rotary head; and
   (d) discriminating means for outputting a plurality binary signals which respectively indicate a recording condition of each of at least two of said plurality of areas according to outputs of said first and second detection means one level of said binary signals indicating that said information signals are recorded, another level of said binary signals indicating that said information signals are not recorded.

2. An apparatus according to claim 1, further comprising means for mixing a reference signal of a predetermined frequency value with said information signals to be recorded by said head means.

3. An apparatus according to claim 2, wherein said first detection means includes a detection circuit which detects said reference signal included in signals produced from said rotary head.

4. An apparatus according to claim 3, wherein said reference signal is arranged to be of a frequency value lower than a carrier frequency of said information signals.

5. An apparatus according to claim 3, further comprising:
   mixing means for mixing pilot signals of a plurality of different frequency values with said information signals to be recorded by said head means; and
   control means for controlling the position: of said head means and that of said medium relative to each other by using said pilot signals included in signals produced from said head means.

6. An apparatus according to claim 5, wherein the frequency of said reference signal is lower than a carrier frequency of said information signals and differs from any of the different frequency values of said pilot signals.

7. An apparatus according to claim 1, wherein said first detection means includes a detection circuit which is arranged to detect a carrier wave of said information signals included in an output of said head means.

8. An apparatus according to claim 1, further comprising:
   mixing means for mixing pilot signals of different frequency values with information signals to be recorded by said heads means; and
   control means for controlling the position of said head means and that of said medium relative to each other by using said pilot signals included in the signals produced by said head means.

9. An apparatus according to claim 8, wherein said first detection means includes a detection circuit which is arranged to detect at least one of said pilot signals of said different frequency values included in an outputs, of said head means.

10. An apparatus according to claim 9, wherein said information signals are either first information signals including video information or second information signals not including video information; and said first detection means includes a detection circuit which is arranged to at least partially detect said video information.

11. An apparatus according to claim 1, further comprising display means which is arranged to simultaneously make a display which indicates whether or not said information signals are recorded in at least two of said plurality of areas on the basis of said plurality of binary signals output by said discriminating means.

12. An apparatus according to claim 1, wherein said information signals include time-base compressed audio signals.

13. An apparatus comprising to claim 1, wherein said discriminating means includes a first circuit which is arranged to produce a discriminating signal which indicates whether said information signals are recorded or not in said plurality of areas in a time sharing manner.

14. An apparatus according to claim 13, further comprising detection means arranged to detect the rotation phase of said rotary head; and wherein said discriminating means further includes a second circuit arranged to form said plurality of binary signals by using an output signal of said detection means and said discrimination signal.

15. A rotary head type recording and/or reproducing apparatus, comprising
   (a) transducing means including two rotary heads of different magnetizing directions, said rotary heads being arranged to record and/or reproduce information signals individually in or from a plurality of parallel areas of a tape-shaped recorded bearing medium extending in the longitudinal direction of said medium by tracing said medium in such a ay as to obliquely traverse and said plurality of parallel areas;
   (b) detection means for detecting a signal which is included in signals produced by said transducing means and is of a sufficiently low frequency value to be unaffected by the difference in the magnetizing direction between said rotary heads; and
   (c) discriminating means for outputting a plurality of binary signals which respectively indicate a recording condition of each of at least two of said plurality of areas on the basis of an output of said detection means, one level of said binary signals indicating that said information signals are recorded, another level of said binary signals indicating that said information signals are not recorded.

16. An apparatus according to claim 15, further comprising display means arranged to simultaneously make a display which indicates whether said information signals are recorded or not in at least two of said plurality of areas on the basis of said plurality of binary signals output by said discriminating means.

17. An apparatus according to claim 15, further comprising mixing means which is arranged to mix a reference signal of a predetermined frequency value with said information signals to be recorded by said transducing means.

18. An apparatus according to claim 17, wherein said detection means includes a detection circuit which is arranged to detect a component of the signals produced by said transducing means representing said reference signal within the signals.

19. A rotary head type recording and/or reproducing apparatus, comprising:
   (a) a rotary head for recording and/or reproducing information signals individually in or from a plurality of parallel areas extending in the longitudinal direction of a tape-shaped record bearing medium, said head being arranged to trace said medium in such a manner as to obliquely traverse said plurality of areas;
   (b) designating means for designating one of said plurality of areas;
   (c) reproducing means for reproducing said information signal by using signals produced by the rotary head from said area designated by said designating means; and
   (d) discriminating means for outputting a binary signal which indicates a recording condition of one of said plurality of areas other than said designated area by using signals produced by said rotary head during the operation of said reproducing means, one level of said binary signal indicating that said information signals are recorded, another level of said binary signals indicating that said information signals are not recorded.

20. An apparatus according to claim 19, further comprising display means which is arranged to make a display which indicates whether said information signals are recorded or not in at least two of said plurality of areas on the bias of said binary signal output by said discriminating means.

21. An apparatus according to claim 19, further comprising:
   mixing means for mixing pilot signals of different frequency values with said information signals to be recorded by said rotary head; and
   control means which is arranged to control the position of said head and that of said medium relative to each other by using said pilot signals included in the output of said rotary head obtained from said designated area.

22. A rotary head type recording and/or reproducing apparatus, comprising:
   (a) transducing means including a pair of rotary heads which are arranged to record and/or reproduce information signals individually in or from a plurality of parallel areas of a tape-shaped record bearing medium extending in the longitudinal direction of said medium by alternately tracing said medium in such a way as to obliquely traverse said plurality of parallel areas;
   (b) reproducing means for reproducing said information signals recorded in one of said plurality of areas by alternately using signals produced by said pair of rotary heads; and
   (c) discriminating means for outputting a plurality of binary signals which respectively indicate a recording condition of each of at least two of said plurality of areas by using only signals produced by one of said pair of rotary heads, one level of said binary signals indicating that said information signals are recorded, another level of said binary signals indicating that said information signals are not recorded.

23. An apparatus according to claim 22, wherein said pair of rotary heads have their magnetizing directions relative to their tracing direction different from each other.

24. An apparatus according to claim 23, further comprising mixing means for mixing a reference signal with said information signals to be recorded by said pair of rotary heads, said reference signal being of a frequency value sufficiently low not to be affected by the difference between the magnetizing directions of said heads.

25. An apparatus according to claim 24, wherein said discriminating means includes a detection circuit which is arranged to detect said reference signal included in the output of one of said pair of rotary heads.

* * * * *

UNITED STATES PATENT AND TRADEMARK OFFICE
CERTIFICATE OF CORRECTION

PATENT NO. : 4,958,246

DATED : September 18, 1990

INVENTOR(S) : Suzumu Kozuki, Hiroyuki Takimoto, Motokazu Kashida, Koji Takahashi and Kenichi Nagasawa It is certified that error appears in the above-identified patent and that said Letters Patent is hereby corrected as shown below:

On the title page, the third line under

[30] Foreign Application Priority Data

Dec. 17, 1984 [JP] Japan............59265666

Signed and Sealed this

Thirtieth Day of June, 1992

Attest:

DOUGLAS B. COMER

*Attesting Officer*      *Acting Commissioner of Patents and Trademarks*